United States Patent [19]

Seto et al.

[11] 4,324,705

[45] Apr. 13, 1982

[54] PROCESS FOR RECOVERING MATERIALS FROM SCRAPPED FILM

[75] Inventors: Kunihira Seto; Kyoichi Naruo, both of Fujinomiya, Japan

[73] Assignee: Fuji Photo Film Co., Ltd., Kanagawa, Japan

[21] Appl. No.: 158,755

[22] Filed: Jun. 12, 1980

[30] Foreign Application Priority Data

Jun. 13, 1979 [JP] Japan ................................. 54-74259

[51] Int. Cl.$^3$ .............................................. C08J 11/04
[52] U.S. Cl. ....................................... 521/44; 134/10; 521/45; 521/48; 521/48.5; 521/40
[58] Field of Search ............................ 260/2.3; 134/10

[56] References Cited

U.S. PATENT DOCUMENTS 3,503,904  3/1970  Dietz et al. .......................... 260/2.3
3,652,466  3/1972  Hittel et al. .......................... 260/2.3
3,928,253  12/1975  Thornton et al. .................... 260/2.3
4,078,916  3/1978  Gerber et al. ....................... 260/2.3

Primary Examiner—Allan Lieberman
Attorney, Agent, or Firm—Sughrue, Mion, Zinn, Macpeak & Seas

[57] ABSTRACT

A process for recovering materials from scrapped film is described which comprises separating coating layers and a film base from a scrapped film having at least one coating layer on a plastic film base in a sheet or web form, wherein the improvement comprises:

impregnating the coating layers of said scrapped film with a strong alkaline solution and stripping the coating layers by means of high pressure jet water to separate said coating layers from the film base before the coating layers are dissolved in or separated from the film base by said alkaline solution.

12 Claims, No Drawings

PROCESS FOR RECOVERING MATERIALS FROM SCRAPPED FILM

BACKGROUND OF THE INVENTION

1. Field of the Invention

The present invention relates to a process for recovering materials from scrapped film and, particularly, to a process for recovering film bases and/or coating films by removing coating materials from photographic film. In this specification, the term "scrapped film" refers to unusable pieces of film obtained in one or more steps during production of photographic films, or to photographic film after use and processing.

2. Description of the Prior Art

It is generally known to recover silver from photographic emulsion layers from scrapped films obtained during the production of photographic films, or from photographic films after use and processing, and to utilize film bases again as a reclaimed polymer, by recovering thereof.

Prior processes for recovery include those described in U.S. Pat. Nos. 3,652,466 and 3,503,904 and Japanese Patent Application (OPI) Nos. 63768/74, 124141/74 and 80371/75 (the term "OPI" as used herein refers to a "published unexamined Japanese patent application"). All of these processes, however, comprise breaking scrapped film into pieces of from 6 to 25 mm $\phi$ (diameter) and separating coating films by dissolving in or stripping by a defilming treating solution. The defilming treatment of photographic emulsion layers is carried out using a warm aqueous solution of a proteolytic enzyme or a dilute aqueous solution of sulfuric acid having a high temperature (for example, 90° C.). The treatment requires a period of time of from several minutes to several tens of minutes, with stirring. In practice, in order to increase the yield of recovery of photographic emulsion materials, water washing is repeatedly carried out and the resulting washing solution is then subjected to a step for recovering silver. On the other hand, the fragments of the scrapped film from which photographic emulsions were removed are dipped in an aqueous solution of caustic soda having a temperature of from 80° to 90° C., or in a glycol solution for from 20 to 30 minutes, in order to remove a subbing layer (present for the purpose of improving adhesion of the photographic emulsion to the film base). Stirring may accompany such steps. The sufficiently stripped subbing layer is then separated by water wash to recover the film base. Furthermore, an alternative process comprises separating the photographic emulsions and the subbing layer by processing fragments of scrapped films with a solution of caustic soda at from 80° to 90° C.

However, these prior art processes have the following defects:

First, the coating materials are forced into the cut ends of the film base by cutting blades, though the degree thereof depends upon the sharpness of the cutting blade, when the scrapped film is cut into pieces. Consequently, the coating materials at such cut ends become impossible to remove by the subsequent defilming step, and the recovered film base may contain many impurities, as a result of which the reclaimed polymer has low quality.

Second, the coating materials dissolving in the defilming solution may be adsorbed onto or permeate into the defilmed film base, to cause coloration of the film base, when fragments of the scrapped film are subjected to defilming treatment. In the case of photographic films, fragments of the scrapped film are dipped in a strong alkaline solution at about 80° C., wherein the photographic emulsions dissolve first, and a subbing layer is then stripped. After the subbing layer is sufficiently stripped, the photographic emulsions and the subbing layer are separated from the film base by a water stream to recover the film base. But the recovered film base is dark in color. The reason for this is believed to be that silver halide in the photographic emulsions is reduced by the alkali, and is then adsorbed onto or permeates into the film base.

Third, in order to prevent coloration of the film base caused by the coating materials dissolving in the defilming treating solution, it is necessary, in case of a scrapped photographic film, to remove the subbing layer with a heated alkaline solution after the photographic emulsions are treated with a solution of expensive proteolytic enzyme and washed with water sufficiently. As can be understood from the foregoing, the steps for defilming and recovering film base are complicated and require the use of a lot of chemicals, as a result of which the costs for recovery increase.

Fourth, the step which comprises separating coating materials in a scrapped film by dissolving or stripping and washing with water requires a long treating time. Particularly, considerable time is required for the step of the water wash. For example, it is necessary to carry out a water wash for from 1 to 1.5 hours per batch in the case of recovering a scrapped photographic film. Accordingly, with respect to the recovery of coating materials and/or the film base by removing the coating layers from scrapped photographic film, it has been desired for a long time to provide a practical process capable of separating easily and completely the coating layers in a short period of time without cutting said scrapped film in pieces.

SUMMARY OF THE INVENTION

A first object of the present invention is to provide a process for recovering a film base material free from impurities which comprises completely removing coating materials from a scrapped film having coating layers. More particularly, it is an object to provide a process by which defilming is carried out in a sheet or web form without cutting the scrapped film, and to provide a process in which the coating materials dissolving in the defilming solution are not adsorbed again in or on the film base.

A second object is to provide a process by which the recovery cost of scrapped films is reduced. More particularly, this object is to provide a process by which time necessary to defilm the coating layers from a scrapped film and the time necessary for separating the coating layers from the film base are remarkably shortened and to provide a process in which the amount of chemicals necessary for defilming and separating the coating layers and the amount of water to be used are reduced.

Thus, this invention relates to a process for recovering a film base and/or coating materials by removing the coating materials from the plastic film which has at least one coating layer on a plastic film base in a sheet or web form, said process comprising impregnating the coating layers directly with a strong alkaline solution without breaking said scrapped film to fine pieces and, thereafter, stripping the coating layers from the scrapped film by applying high pressure jet water.

DETAILED DESCRIPTION OF THE INVENTION

Though the scrapped films to be treated in the present invention are not restricted to certain kinds, it is preferred to use scrapped films obtained during the production of photographic films, or from photographic films after use and processing. The process of the present invention is particularly suitable for application to a photographic film comprising a vinylidene chloride copolymer as an undercoating material as described in Japanese Pat. No. 7581/58 and a photographic film comprising a styrene-butadiene copolymer as an undercoating material as described in Japanese Pat. No. 3564/73. By impregnation of the coating layers of said scrapped film with a strong alkaline solution heated to about 70° C. to 95° C., it becomes possible to carry out defilming by application of a jet of water. Though the alkali agent used for the strong alkaline solution in the present invention is not particularly restricted, it is preferred to use an alkali agent for which the pH of an aqueous solution containing 0.1% by weight thereof is at least 9.0 at 25° C. Examples include an aqueous solution or a glycol solution of alkali metal hydroxide or alkaline earth metal hydroxide. Particularly preferred examples include from 5 to 10 wt% aqueous solutions of caustic soda or caustic potash heated to from about 80° C. to 90° C. As processes for impregnating the coating layers of the scrapped film with the strong alkaline solution, the scrapped film can be dipped in the strong alkaline solution for a short period of time, or a process can be used which comprises applying strong alkaline solution to said scrapped film. The term "impregnation" refers to the state wherein the aqueous alkaline solution permeates from the surface of coating layers to reach to the interface of the base, but the surface of coating layer does not begin to dissolve. For example, in the case of a scrapped photographic film, it is sufficient to dip the film in a 10% aqueous solution of caustic soda heated to 90° C. for only few seconds. Dipping for 10 seconds or more in a 10% aqueous solution of caustic soda heated to 90° C. is not desired, because the photographic emulsions begin to dissolve in the solution of caustic soda, and consequently the step of recovering the photographic emulsions becomes complicated and the recovery becomes rather high in cost. Rather, the scrapped film impregnated with the strong alkaline solution is processed in the next step, where the coating layers are stripped from the film base by high pressure jet water (that is, water sprayed under high pressure from one or more nozzles). The conditions for applying the jet water depend upon a destruction strength of the coating layers and an adhesive force to the film base. It is, however, preferred that the water temperature is from about 5° to 95° C., and particularly from 15° C. to 50° C., and the pressure is from about 3 to 50 kg/cm$^2$.

In the process of the invention, it is also possible that the application of jet water is carried out twice or more. For example, a scrapped film impregnated with a strong alkaline solution is subjected to application of a jet of water at from 3 to 10 kg/cm$^2$ of the pressure to remove photographic emulsion layers and it is subsequently subjected to application of a jet of water at from 10 to 50 kg/cm$^2$, and particularly at from 20 to 40 kg/cm$^2$ of pressure, to remove the subbing layer. When the present inventors have attempted to remove the subbing layer of the scrapped photographic film by applying the jet of water at 700 kg/cm$^2$ of pressure without impregnating with the strong alkaline solution as shown in Example 2, removal of the subbing layer is completely impossible. Accordingly, it is a significant discovery that firmly bonded coating layers can be removed in a moment by applying the jet water at 50 kg/cm$^2$ or less, if they are impregnated with a strong alkaline solution even for only few seconds.

The defilming solution containing the photographic emulsions is sent to a silver recovery step. The recovered film base is finely broken, and can be utilized again as a film forming material or another material directly or after pelleted by compression molding or melt molding.

Effects obtained by the present invention are as follows. First, since the coating layers can be completely removed from the scrapped film, the film base material contains hardly any impurities, and, consequently, reclaimed polymer of high quality can be produced. Second, since the scrapped film is not broken into fine pieces for carrying out the defilming treatment and water wash, there is not any fragment of the film base which flows out together with the treating solution and, consequently, the yield of recovery of the film base is improved. Third, since the coating layers can be separated at a moment simultaneously with defilming by means of the jet water when impregnated with a strong alkaline solution for only few seconds, the recovery step is very simple and the treating time is shortened. Fourth, since the impregnation is carried out using only a strong alkaline solution having several % of the concentration as a chemical for defilming treatment, the amount of the chemical is remarkably small as compared with the prior processes for dissolving coating materials. Fifth, in case of recovering coating materials, since separated coating layers may be dispersed in a flake state in the aqueous alkaline solution having a very low alkali content, separation of the coating materials can be attained by simple filtration or precipitation by cohesion in a short time. Furthermore, the water in the filtrate can be used again. Accordingly, it is advantageous in cost. Sixth, the amount of water to be used for defilming and separation, based on unit weight of the scrapped film, is less than that of the prior art processes.

EXAMPLE 1

A scrapped film (355.6 mm×431.8 mm) of a medical X-ray film prepared by applying a subbing layer comprising a copolymer of butadiene, acrylic acid and styrene (molar ratio: 40:0.5:59.5) and a silver halide emulsion layer to a biaxially stretched polyethylene terephthalate film base (200μ) was dipped for 3 seconds in a 10% aqueous solution of caustic soda heated to 90° C., and it was then passed at a rate of 20 m/min under a jet water at 5 kg/cm$^2$ of pressure, by which the photographic emulsion layer was separated and removed in a moment. In the water jetting apparatus, four nozzles which were in a row at regular intervals in a rectangular direction with respect to the direction of movement of the scrapped film, which were opposite with the scrapped film at 12 cm of the distance so that both surfaces of the scrapped film could be treated at the same time. The nozzle was fan shaped, and the spray angle thereof was 30°. The amount of water per nozzle was 15 liters/min. When the defilming solution was collected, the photograhic emulsions had the size of several millimeters to several centimeters, which could be recovered easily by precipitation in a stationary state.

The scrapped film from which the photographic emulsion was removed by defilming was then passed at a rate of 20 m/min, while the pressure of water by the water jetting apparatus was increased to 25 kg/cm$^2$, by which the subbing layer was instantly removed. In order to examine whether the coating materials were completely removed or not, a dyeing treatment was carried out at 70° C. for 5 minutes with using a 0.1% aqueous solution of a water-soluble dye (Crystal Violet, produced by Kanto Chemical Co.). After washing with water and drying, it was observed using a projection microscope (Nippon Kogaku K.K.) of 50 magnifications. When coating materials remain, a violet color results. As a result of the examination, it had been proved that no coating materials remained.

EXAMPLE 2

Removal of a photographic emulsion layer and a subbing layer was carried out with using the same scrapped medical X-ray film as in Example 1, but varying the conditions of the previous treatment for the coating layer and the pressure of jet water as shown in Table 1. The water jetting apparatus used was the same as that in Example 1.

TABLE 1

| Test No. | Conditions of Defilming the Coating Layer | |
|---|---|---|
| | Conditions of Previous Treatment | Pressure of Jet Water (kg/cm$^2$) |
| 1 (Invention) | Dipping for 5 seconds in 10% aqueous solution of caustic soda at 90° C. | 15 |
| 2 (Invention) | Dipping for 20 seconds in 10% aqueous solution of caustic soda at 70° C. | 30 |
| 3 | No previous treatment | 30 |
| 4 | No previous treatment | 700 |
| 5 | Dipping for 5 minutes in hot water at 100° C. | 30 |
| 6 | Dipping for 5 minutes in hot water at 100° C. | 700 |

TABLE 2

| Test No. | Results of Defilming Tests | |
|---|---|---|
| | Removal of Photographic Emulsion Layer | Removal of Subbing Layer |
| 1 (Invention) | Good | Good |
| 2 (Invention) | Good | Good |
| 3 | Poor | Poor |
| 4 | Good | Poor |
| 5 | Good | Poor |
| 6 | Good | Poor |

As is shown in Table 2, the results of the defilming tests show that, though the photograhic emulsion layer can be removed under the pressure of jet water of several hundreds kg/cm$^2$ in the case of no previous treatment, or several tens kg/cm$^2$ in case of treating with hot water, it is not possible to remove the subbing layer when the treatment with the hot solution of caustic soda is not carried out.

Preferred embodiments of the invention are as follows: First, a process for separating coating layers and a film base from a scrapped film which has at least one coating layer, in a sheet or web form, wherein the coating layers of said scrapped film have been previously impregnated with a strong alkaline solution. In a preferred embodiment, the film is dipped for from about 1 to 60 seconds in a 5 to 10 wt% aqueous solution of caustic soda heated to from about 70° to 95° C., and the film is removed from the presence of the caustic soda solution before the coating layers begin to dissolve in the solution. Then, a jet water of from 3 to 10 kg/cm$^2$ of the pressure is applied to the scrapped film having the coating layers impregnating with the solution of caustic soda to strip the photographic emulsion layers. Subsequently, a jet of water of from 10 to 50 kg/cm$^2$ of the pressure is applied to remove the subbing layer, by which the film base is thus recovered. A preferred embodiment for jetting water is a method which comprises moving the scrapped film under a jet or jets of water by a fixed apparatus. In a further preferred embodiment, the scrapped film having at least one coating layer is a photographic film, containing a photographic emulsion layer.

While the invention has been described in detail and with reference to specific embodiments thereof, it will be apparent to one skilled in the art that various changes and modifications can be made therein without departing from the spirit and scope thereof.

What is claimed is:

1. A process for recovering materials from scrapped photographic film which comprises separating coating layers and a film base from a scrapped photographic film having at least one coating layer on a plastic film base, wherein the improvement comprises:
   impregnating the coating layers of said scrapped film with a strong alkaline solution having a pH of at least 9.0 at 25° C. and stripping the coating layers by means of high pressure jet water having a temperature of from about 5° to 95° C. and a pressure of from about 3 to 50 kg/cm$^2$ to separate said coating layers from the film base before the coating layers are dissolved in or separated from the film base by said alkaline solution.

2. A process for recovering materials from a scrapped film as in claim 1, wherein said coating layers include at least one photographic emulsion layer.

3. A process for recovering materials from a scrapped film as in claim 1, wherein said alkaline solution is formed from an alkali metal hydroxide or an alkaline earth metal hydroxide.

4. A process for recovering materials from a scrapped film as in claim 3, wherein said alkaline solution is an aqueous solution of from 5 to 10 wt% caustic soda or caustic potash heated to a temperature of from about 80° to 90° C.

5. A process for recovering materials from a scrapped film as in claim 1, wherein the high pressure jet water has a temperature of from about 15° to 50° C. and a pressure of from about 3 to 50 kg/cm$^2$.

6. A process for recovering materials from a scrapped film as in claim 1 including a photographic emulsion layer and an adhesive subbing layer for adhering said photographic emulsion layer to said film base, wherein said photographic emulsion layer is removed by application of a jet water at from 3 to 10 kg/cm$^2$, and said adhesive subbing layer is subsequently removed by application of a jet of water at from 10 to 50 kg/cm$^2$.

7. A process for recovering materials from a scrapped film as in claim 5 comprising a photographic film including a photographic emulsion layer and an adhesive subbing layer for adhering said photographic emulsion layer to said film base, wherein said photographic emulsion layer is removed by application of a jet of water of from 3 to 10 kg/cm², and said adhesive subbing layer is subsequently removed by application of a jet of water at from 20 to 40 kg/cm².

8. A process for recovering materials from a scrapped film as in claim 1, or 2, wherein the coating layers are impregnated with said alkaline solution by dipping the film for about 1 to 60 seconds in a 5 to 10 wt% aqueous solution of caustic soda heated to from about 70° C. to about 95° C.

9. A process for recovering materials from a scrapped films as in claims 1 or 2, wherein the alkaline solution is an aqueous solution of an alkali metal hydroxide, an aqueous solution of an alkaline earth metal hydroxide, a glycol solution of an alkali metal hydroxide or a glycol solution of an alkaline earth metal hydroxide.

10. A process for recovering materials from a scrapped films as in claim 9, wherein said alkaline solution is an aqueous or glycol solution of from 5 to 10 wt% alkali metal hydroxide or alkaline earth metal hydroxide heated to a temperature of from about 70° C. to 95° C.

11. A process for recovering materials from a scrapped films as in claim 10, wherein said alkaline solution is an aqueous solution of from 5 to 10 wt% alkali metal hydroxide or alkaline earth metal hydroxide heated to a temperature of from about 70° C. to 95° C.

12. A process for recovering materials from a scrapped films as in claim 1 or 2, wherein the coating layers are impregnated with said alkaline solution by dipping the film for about 1 to 60 seconds in a 5 to 10 wt% aqueous solution of alkali metal hydroxide or alkaline earth metal hydroxide heated to from about 70° C. to about 95° C.

* * * * *